United States Patent
Wang et al.

(10) Patent No.: US 7,483,889 B2
(45) Date of Patent: Jan. 27, 2009

(54) INSTANCE-BASED AUTHORIZATION UTILIZING QUERY AUGMENTATION

(75) Inventors: Alex Wang, Cary, NC (US); Shahrokh Sadjadi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 11/607,310

(22) Filed: Dec. 1, 2006

(65) Prior Publication Data

US 2008/0133530 A1 Jun. 5, 2008

(51) Int. Cl.
*G06F 7/00* (2006.01)

(52) U.S. Cl. .............................. 707/4; 707/10

(58) Field of Classification Search ............... 707/1–10
See application file for complete search history.

(56) References Cited

U.S. PATENT DOCUMENTS

| | | | |
|---|---|---|---|
| 7,085,751 B2 | 8/2006 | Finlay et al. | |
| 7,136,873 B2 | 11/2006 | Smith et al. | |
| 2003/0126136 A1* | 7/2003 | Omoigui | 707/10 |
| 2007/0156668 A1* | 7/2007 | Dettinger et al. | 707/4 |
| 2007/0219976 A1* | 9/2007 | Muralidhar et al. | 707/4 |

* cited by examiner

*Primary Examiner*—Wilson Lee
(74) *Attorney, Agent, or Firm*—Cindy Kaplan

(57) ABSTRACT

In one embodiment, a method for persistent data authorization includes receiving a query at a management device and identifying authorization constraints at the management device utilizing an authorization model. The authorization model includes at least one group hierarchy defining authorization based on a relationship between levels in the hierarchy. The query is modified based on the authorization constraints and the modified query is sent to the database. Data is received in response to the modified query and is configured for transmission from the management device without further filtering. The query received at the management device and the modified query are both configured for communication directly with the database with no modification to the database required for the modified query. A system and apparatus for persistent data authorization are also disclosed.

15 Claims, 5 Drawing Sheets

INSTANCE-BASED AUTHORIZATION UTILIZING QUERY AUGMENTATION

BACKGROUND OF THE INVENTION

The present disclosure relates generally to management systems, and more particularly, to authorization for management applications which require instance based authorization.

In management applications, operational task authorization is an important and commonly performed function. Authorization to access information stored in a database may be given to only select users for certain tasks on limited managed entities. For example in network management, a MPLS (Multiprotocol Label Switching) service operator may only manage MPLS VPN (Virtual Private Network) configuration, whereas an IPSec (Internet Protocol Security) service operator may only provision IPSec service. Management applications enforce authorization for operators to perform certain tasks.

In a typical multi-tiered software system, managed entities are stored as model objects. Operational requests, such as retrieval of a list of network devices or interfaces, are typically implemented as a query to the database. Database queries are statements used for directing database management systems to access data stored in a database. To enforce security policies, a security system or authorization component is integrated with a database access component. This is conventionally done in two steps. First, the query is executed and candidate instances which match the criteria are retrieved from data storage. The instances may be, for example, ports managed by the management system. The retrieved set of instances is then filtered one by one based on the authorization policy defined for the requesting user.

This approach works well for bounded authorization (i.e., the requested instances are known prior to access); however, it does not scale well for unbounded authorization, where the filtered instances are not known prior to applying a security filter. An example of unbounded instance authorization is the access of network devices that an operator is authorized to manage. Depending on the security policy for the requesting user, the number of authorized devices may vary. When the system is scaled up, performance may significantly degrade if all instances have to be read and processed. The performance impact in large deployment is often unacceptable and authorization is turned off, or authorization granularity moved up to the next level (e.g., from port level to chassis level).

Proxy design pattern has been applied to alleviate the performance issue. Instead of retrieving real or actual instances, a persistent layer constructs and returns proxies. Proxy instance contains identifier of the actual instance, so it is easier to construct the proxy than the instance itself. With security interception, proxy improves system performance as unauthorized instances are not constructed. However, unbounded authorization still involves the overhead of proxy interception of each proxy instance. Thus, proxy design eliminates implementation construction, but still requires per-object filtering.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
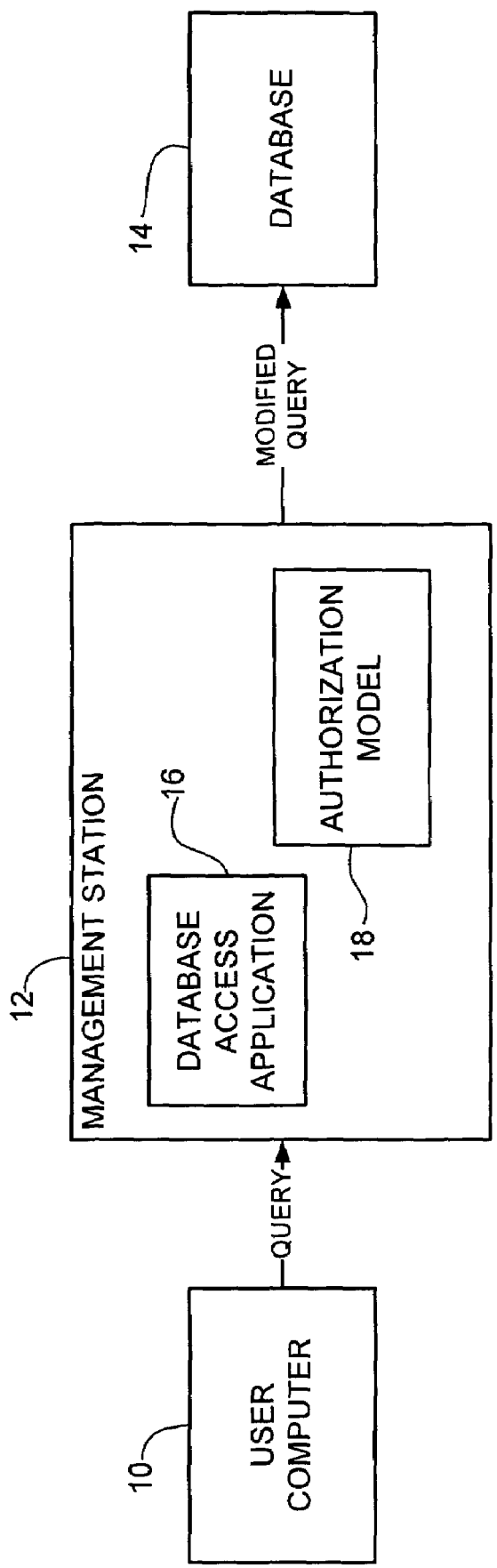
FIG. 1 illustrates an example of a network in which embodiments described herein may be implemented.

In one embodiment, a method for persistent data authorization includes receiving a query at a management device and identifying authorization constraints at the management device utilizing an authorization model. The authorization model includes at least one group hierarchy defining authorization based on a relationship between levels in the hierarchy. The query is modified based on the authorization constraints so that authorization filtering is performed at a database. The modified query is then submitted to the database. Data is received in response to the modified query and is configured for transmission from the management device without further filtering. The query received at the management device and the modified query are both configured for communication directly with the database with no modification to the database is required for the modified query. A system and apparatus for database authorization are also disclosed.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The embodiments disclosed herein provide a method and system for dynamically modifying application query requests for unbounded instance authorization. The system intercepts a database application query and reconstructs it by augmenting an authorization model to the query statement. The security model is enforced by a model persistent layer.

The method and system operate to modify a query received at a management application to reduce processing time required in reading and filtering data from the database without requiring modification or additions to the existing database structure. Also, access to data may be achieved with only a single pass to read the data from the database rather than requiring multiple passes between the management station and database to collect a specified set of data.

In one embodiment, the method and system utilize an authorization model to determine authorization constraints at a management device. The authorization constraints are used to modify a database query so that authorization filtering is performed at the database, rather than at the management station after the data is retrieved from the database.

As described below, authorization inheritance can also be achieved by this augmentation approach. In an object model, an instance may be contained by another instance. This eventually allows a system to manage a model instance hierarchy. Instead of granting privilege to each one of target objects, it may be desirable for the system administrator to grant privileges to container instances. Any instances that are contained by other instances will inherit the privileges to container instances. This feature is done by checking if an instance is implied of being authorized. This approach requires more filter processing by authorization component. The proposed augmentation approach, however, adds authorization inheritance context to the query constraint so that inheritance hierarchy can be achieved via multiple entity join. This makes the model persistent component more powerful as authorization inheritance is implemented by database query.

Referring now to the drawings, and first to FIG. 1, one example of a network that may implement embodiments described herein is shown. The embodiments operate in the context of a data communication network including multiple network devices. The network devices may include, for example, a master central processing unit (CPU), interfaces, and a bus. The CPU preferably includes memory and a processor. The network device may be implemented on a general purpose network host machine such as a computer system or network device described below with respect to FIG. 5.

As shown in the example of FIG. 1, the network includes a user computer 10, network management station 12, and a database server 14. The nodes are interconnected by network communication links. The network communication links interconnect various components within the network. The links may include any combination of Ethernet links, local area network (LAN) links, virtual local area network (VLAN) links, wide area network (WAN) links, private intranet links, links over the public Internet, or any other suitable link.

The user computer is operable to send a query requesting data from a database to the network management station 12. It is to be understood that the term 'user', as used herein may refer to a user inputting the request to the user computer or a network device generating the request. Also, the request may be input directly to the management station 12. The network management station 12 comprises a database application 16 operable to provide instance-based authorization for access to a database 14. An authorization model (e.g., information on roles, privileges, groups, and classes described below with respect to FIG. 2) is also preferably stored at the management station 12 or stored at another device which is accessible by the management station. The database 14 may be stored at a database server or may be stored at another device and accessed by the server or other network device. Interaction with the database 14 is carried out according to an industry standard protocol such as Structured Query Language (SQL) protocol or any other suitable protocol, which may be an industry standard protocol or a proprietary protocol. In one embodiment, the system utilizes Enterprise JavaBeans Query Language (EJB QL).

It is to be understood that the network shown in FIG. 1 is only one example and that other network configurations having any number of nodes may be used without departing from the scope of the invention. Also, the query augmentation (modification) described herein may be applied at any network device and the network management station described herein is only one example of a network device that may perform the query augmentation and interact with the database.

Figure 2:
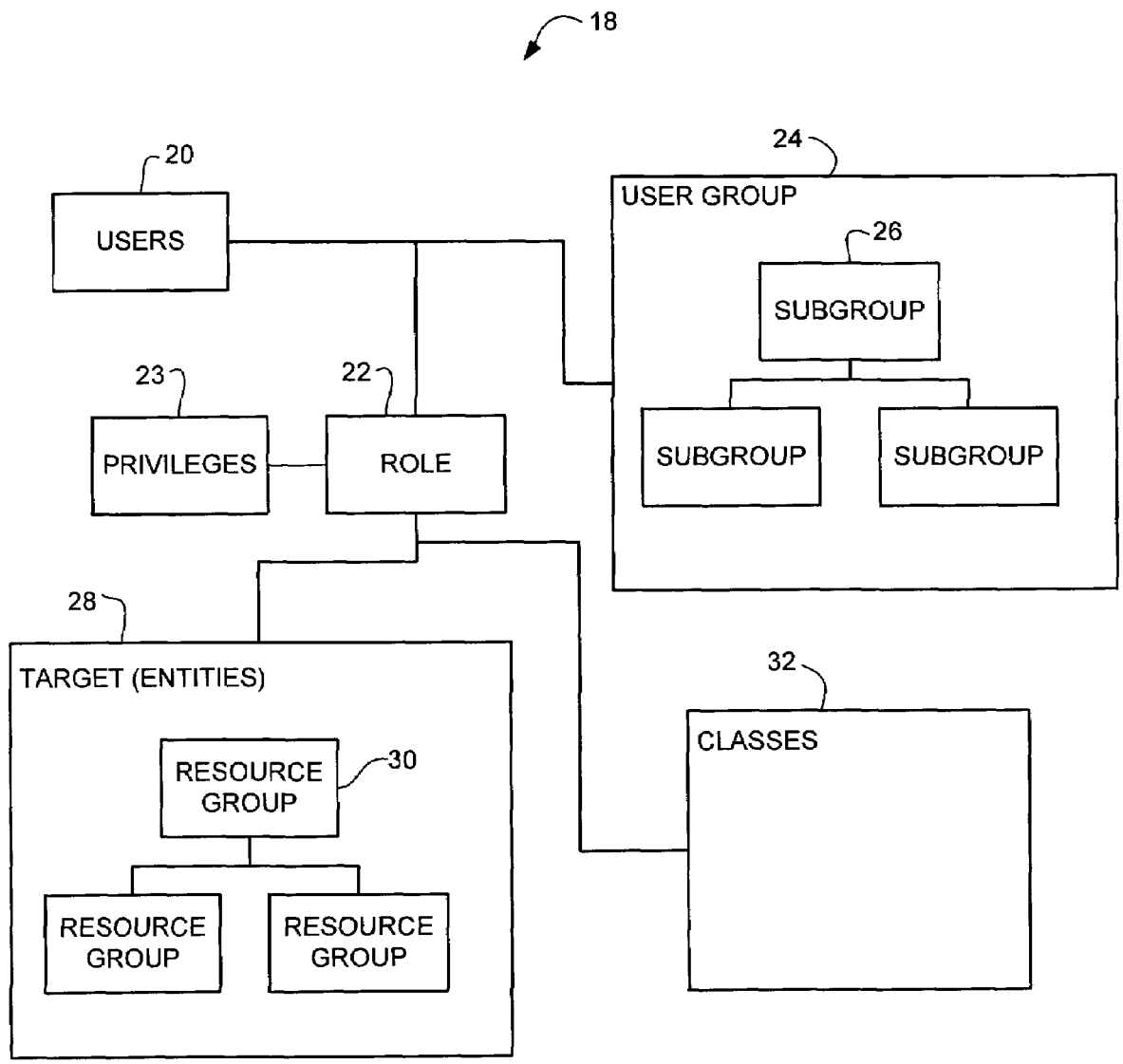
FIG. 2 illustrates an authorization model in accordance with one embodiment.

In one embodiment the system uses an authorization model 18 comprising several model entities, as illustrated in FIG. 2. The authorization model defines authorization constraints for a specified user. The constraints may limit the data available for access by the user or expand the limits of data access based on a hierarchical relationship between types of data in the database or groups that the user belongs. Each user 20 is assigned one or more roles 22 based on, for example, their position in an organization, responsibilities, or job function. Access to data or performance of common operations may be given to all users. Other operations that a user is permitted to perform or access to data are based on the user's role. The roles may have overlapping responsibilities and privileges 23; that is, users belonging to different roles may perform common operations. Role aggregates multiple privileges, where a privilege represents the system defining operation permissions. Roles can be updated without updating the privileges for every user on an individual basis. A role may be granted to user group 24 or subgroup 26 to access target model instances.

The roles 22 correspond to privileges for specified target data 28. The target data refers to entities within the database and may also belong to a specified resource group 30, contained in one or more hierarchy groups.

Figure 3:
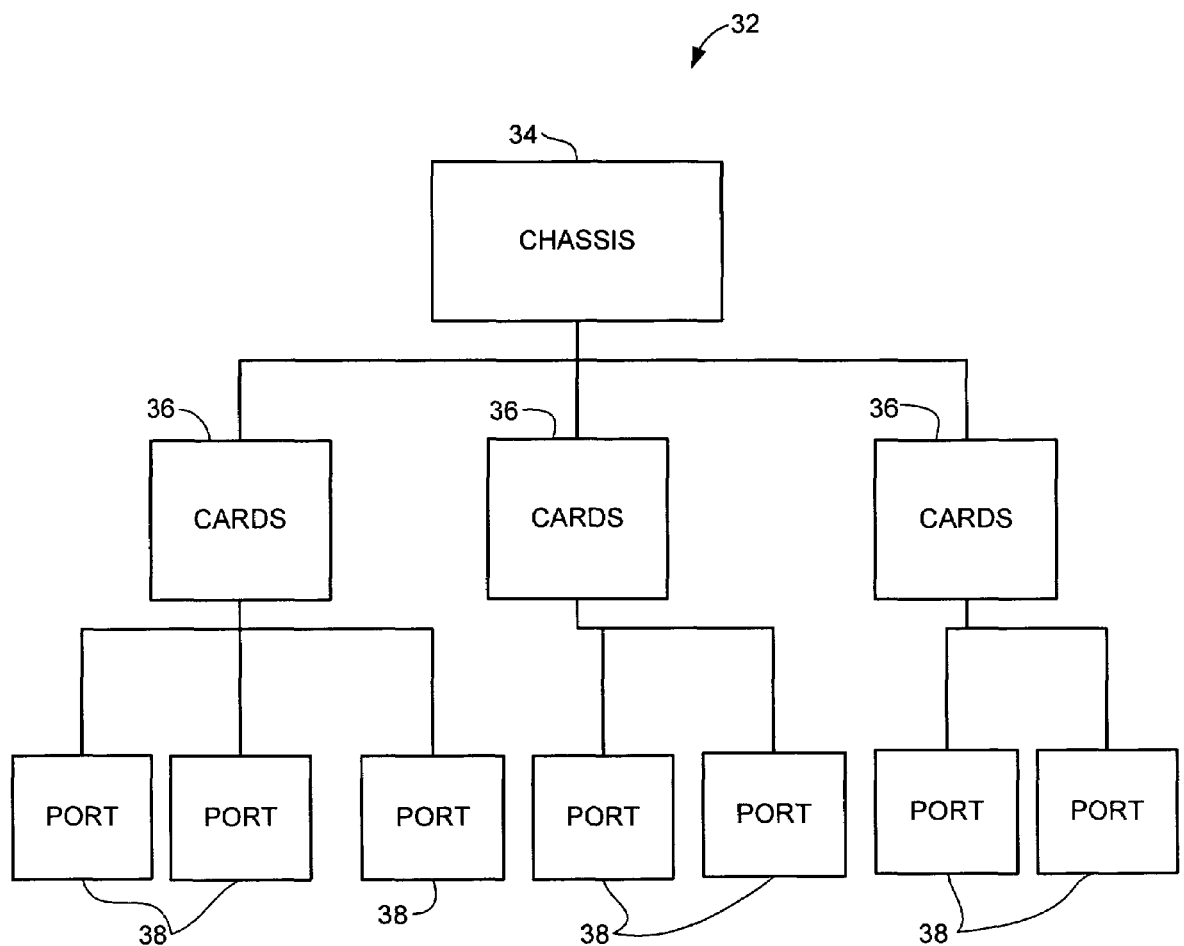
FIG. 3 illustrates one example of a class hierarchy of the authorization model of FIG. 2.

At another level, authorization may be based on the level of access in a class hierarchy 32. FIG. 3 illustrates an example of a class hierarchy which allows for authorization inheritance based on the level of authorization in the hierarchy. Referring to the class hierarchy example shown in FIG. 3, a chassis 34 is at the top of the hierarchy. cards 36 are at a next level, and at a lower level are ports or physical connections 38. In this example, the card's parent class is chassis. Authorization may be determined based on a relationship between levels in the hierarchy. For example, users having specified roles may only have access to specified ports 38 in a card module 36. Another user may have access to one or more cards 36 and based on access to the cards, also have access to all ports 38 on those cards. At a higher level in the hierarchy, a user may have access to a chassis 34 supporting all associated cards 36 and ports 38.

As previously discussed, application requests for persistent model instances may be expressed via a query language. The query augmentation is performed independent from the database and therefore requires no modifications to the database. From the perspective of the database 14, the augmented query is interpreted the same as any other query statement. The model persistent layer at the management station 12 intercepts the query statement before it is submitted to the connected database 14. The system first parses the query statement and searches for target instance type as well as query conditions in the authorization model 18. The system retrieves user context for the current operator. A nested query is prepared to retrieve all user groups 24 and subgroups (supergroups) 26 that the current operator belongs to. An outer query retrieves all target groups 28 of which each entity is a granted role target. The outer-most query recursively unions all subgroups if the privilege is granted to a parent class 32. This query resolves a set of privileged target groups.

With these result sets, additional constraint of instances being members of authorized target groups is formed. In one embodiment, the final query statement to the database 14 is reconstructed with these additional constraints being added to its where clause. This submitted query to database server mutates from the original request in that the authorization context is augmented to the original one. Executing the augmented query, the database server 14 retrieves the result consisting of only authorized instances.

Figure 4:
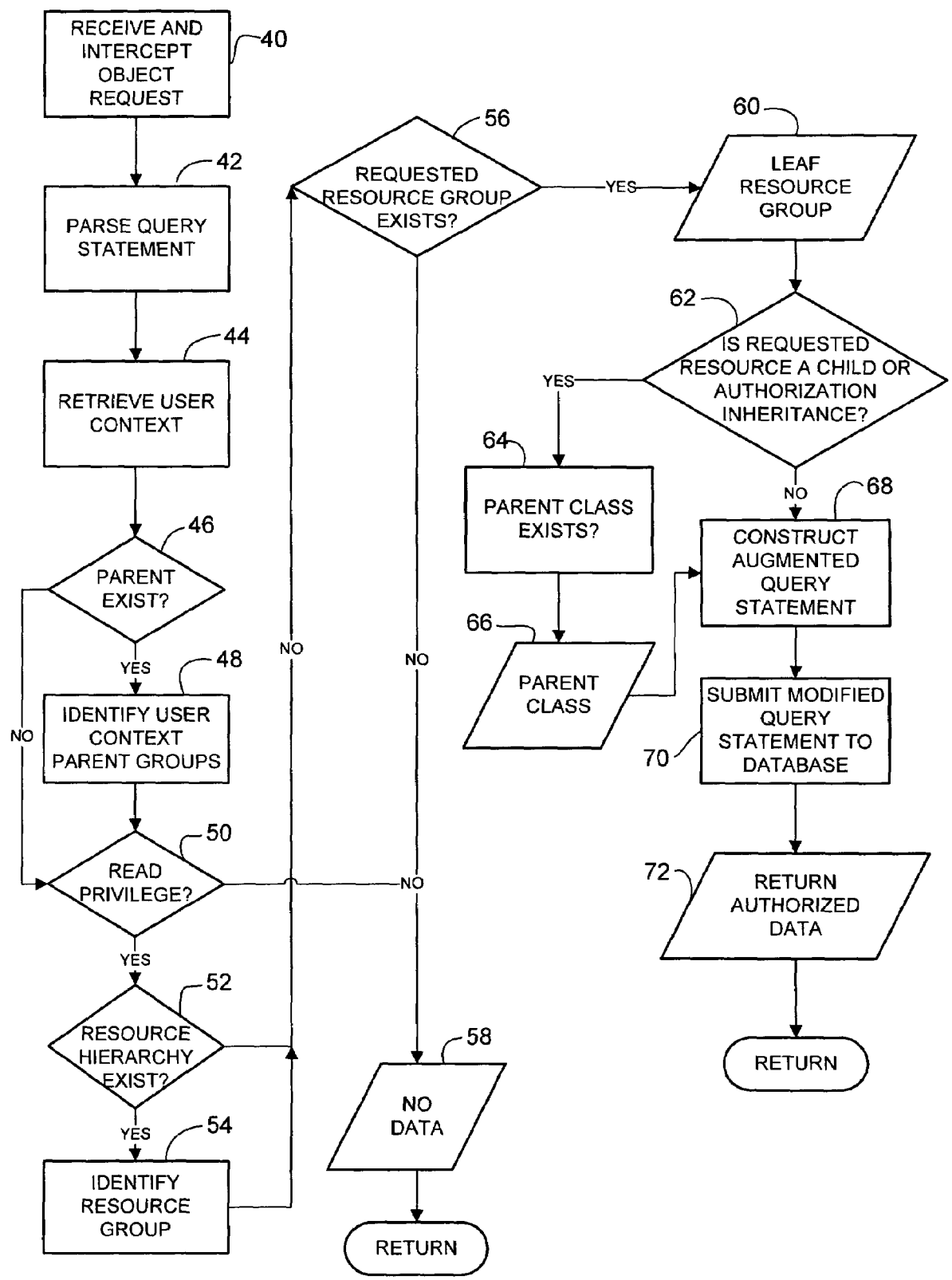
FIG. 4 is a flowchart illustrating an example of a method for instance-based authorization utilizing query augmentation.

FIG. 4 is a flowchart illustrating a method for instance-based authorization utilizing query augmentation according to one embodiment. The object request is received and intercepted at the management station 12 (step 40). The statement is parsed at step 42. Steps 44-66 illustrate one example of identifying authorization constraints utilizing an authorization model comprising at least one group hierarchy. At step 44, the management station 12 retrieves the user context. If one or more parent groups exist for the user, the parent groups are identified (steps 46 and 48). The access application then determines if the user has read privileges for the data requested based on the context information and user groups (step 50). If the user does not have access privileges to the data then no data is returned and the process ends (step 58). If the user does have read privilege for the requested data, it is determined whether there is a hierarchy for the requested resource group (steps 32 and 34). If there is no entity corresponding to the requested resource group then no data is returned and the process ends (steps 56 and 58). If the requested resource group exists then the data identifying the resource group is provided (steps 56 and 60).

If there is authorization inheritance and a parent class exists, the parent class is provided (steps 62, 64, and 66). This data is used to construct the augmented query statement at step 68. At step 70, the modified query statement is submitted to the database 14 and authorized data is returned at step 72. The data is configured for transmission to the user submitting the query request without further filtering.

It is to be understood that the process described above and shown in FIG. 4 is only one example and that steps may be removed or added, or the order of the steps may be changed, without departing from the scope of the invention. Also, steps 44-66 are provided only as an example of one method for identifying authorization constraints for use in modifying the query.

Figure 5:
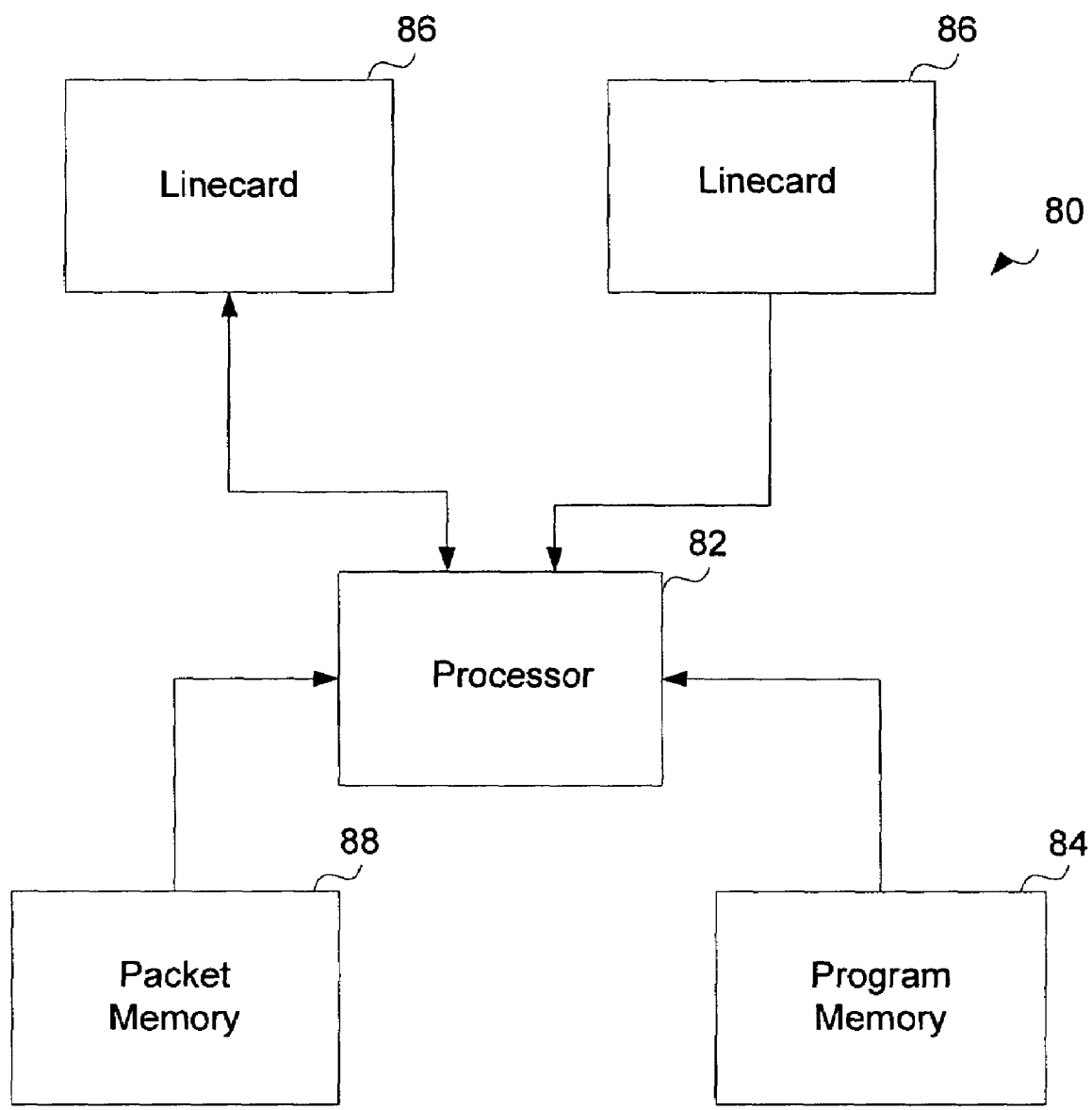
FIG. 5 depicts an example of a network device useful in implementing embodiments described herein.

FIG. 5 depicts a network device 80 that may be used to implement embodiments described herein. In one embodiment, network device 80 is a programmable machine that may be implemented in hardware, software, or any combination thereof. A processor 82 executes codes stored in a program memory 84. Program memory 84 is one example of a computer-readable medium. Program memory 84 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole.

The following examples illustrate augmentation of different types of queries utilizing embodiments described herein.

Example 1

The management station receives the following simple input EJB-QL query:

select object(c) from Chassis c

Upon receiving the query, the user context is retrieved. Next the target groups accessible by the user based on the roles assigned to user groups to which the user belongs are fetched. The user will have access to an instance of Chassis only if it is a member of the target group. The target groups, roles group, and user groups are preferably predefined before running the system in authorization mode. A list of authorized target groups is bound to the augmented query. The input query is parsed and analyzed to extract SELECT clause, FROM clause, etc. The input query is then augmented as follows:

```
select object(c) from Chassis c,
GroupMemberRef gm
where cd.instanceId = gm.memberId
and    gm.memberType = 'com.cisco.nm.model.aal.pesc.Chassis'
and    gm.group.instanceId in (:authorised target groups)
```

Example 2

The following example is for a query with navigation in Where Clause:

```
select OBJECT(pc)
FROM PhysicalConnector pc
where
pc.container_card.container_groupComponent.instanceName=:chName
```

The above query fetches all physical connectors that belong to a chassis. Navigation is from Physical connector->Card->Chassis. The input query is augmented as follows:

```
select pc.instanceName
FROM PhysicalConnector pc,
        GroupMemberRef gm
where
pc.container_card.container_groupComponent.instanceName=:chName
and    pc.instanceId = gm.memberId
and    gm.memberType =
'com.cisco.nm.model.aal.pesc.PhysicalConnector'
and    gm.group.instanceId in (:authGrpIds)
```

In this case, even though the input queries Chassis clause (by way of navigation), it is not necessary to authorize Chassis class because query returns instances of only physical connectors.

Example 3

The following example is for a query with inheritance authorization. The input query is:

Select object(c) from Card c

The augmented query is as follows:

```
select object(c) from Card c,
cd.container_groupcomponent chassis,
GroupMemberRef gm
where chassis.instanceId = gm.memberId
and    gm.memberType = 'com.cisco.nm.model.aal.pesc.Chassis'
and    gm.group.instanceId in (:authGrpIds)
```

In this case, even if the user is not granted any direct access to the Card instances, he will be able to access them provided he has access to the Card's parent class Chassis. This containment relationship is defined in a configuration file of the authorization model.

As can be observed from the foregoing, the unbounded query augmentation described herein has many advantages.

For example, the method and system allow management applications to resolve authorized instances as the query is being processed. Management applications may be built without an additional authorization component or security interceptor. Since the method and system augment the query by extending authorization filtering, the retrieved result set only contains the set which the requesting user has privilege to access. Applying authorization filtering when instances are retrieved and model persistence eliminates post retrieval filtering, and results in return of a smaller set of instances; therefore, system performance and scalability are significantly improved. Furthermore, the system provides for the use of various group hierarchies. Since the augmented query conforms to entries in existing databases, there is no need to modify database schema for operation with the management application.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for persistent data authorization, comprising:
   receiving a query at a management device;
   identifying authorization constraints at the management device utilizing an authorization model, wherein the authorization model comprises at least one group hierarchy defining authorization based on a relationship between levels in said hierarchy;
   modifying said query based on said authorization constraints;
   sending said modified query to a database; and
   receiving data in response to said modified query, the received data configured for transmission from the management device without further filtering;
   wherein the query received at the management device and the modified query are both configured for communication directly with the database with no modification to the database required for the modified query.

2. The method of claim 1 further comprising parsing said query statement and searching for a target instance in said authorization model.

3. The method of claim 1 further comprising retrieving user groups to which a user submitting said query belongs.

4. The method of claim 1 wherein said group hierarchy levels correspond to component type of a network device.

5. The method of claim 4 wherein said component types comprise a chassis at a top level, cards at a middle level, and ports at a bottom level of said hierarchy.

6. An apparatus for persistent data authorization, comprising:
   a processor configured for receiving a query, identifying authorization constraints, modifying said query based on said authorization constraints, sending said modified query to a database, and receiving data in response to said modified query, the received data configured for transmission without further filtering; and
   memory for storing an authorization model used to identify said authorization constraints and comprising at least one group hierarchy defining authorization based on a relationship between levels in said hierarchy;
   wherein said query and said modified query are both configured for communication directly with the database with no modification to the database required for the modified query.

7. The apparatus of claim 6 wherein the processor is configured for parsing said query statement and searching for a target instance in said authorization model.

8. The apparatus of claim 6 wherein the processor is configured for retrieving user groups to which a user submitting said query belongs.

9. The apparatus of claim 6 wherein said group hierarchy levels correspond to component type of a network device.

10. The apparatus of claim 9 wherein said component types comprise a chassis at a top level, cards at a middle level, and ports at a bottom level of said hierarchy.

11. A system for persistent data authorization, comprising:
    means for receiving a query at a management device;
    means for identifying authorization constraints at the management device utilizing an authorization model, wherein the authorization model comprises at least one group hierarchy defining authorization based on a relationship between levels in said hierarchy;
    means for modifying said query based on said authorization constraints;
    means for sending said modified query to a database; and
    means for receiving data in response to said modified query, the received data configured for transmission from the management device without further filtering;
    wherein the query received at the management device and the modified query are both configured for communication directly with the database with no modification to the database required for the modified query.

12. The system of claim 11 further comprising means for parsing said query statement and searching for a target instance in said authorization model.

13. The system of claim 11 further comprising means for retrieving user groups to which a user submitting said query belongs.

14. The system of claim 11 wherein said group hierarchy levels correspond to component type of a network device.

15. The system of claim 14 wherein said component types comprise a chassis at a top level, cards at a middle level, and ports at a bottom level of said hierarchy.

* * * * *